(12) United States Patent
Gerakoulis et al.

(10) Patent No.: US 6,700,864 B1
(45) Date of Patent: Mar. 2, 2004

(54) SYSTEM AND METHOD FOR GENERATING ORTHOGONAL CODES

(75) Inventors: Diakoumis Parissis Gerakoulis, Dover, NJ (US); Saeed S. Ghassemzadeh, Andover, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/368,875

(22) Filed: Aug. 5, 1999

Related U.S. Application Data

(60) Provisional application No. 60/111,261, filed on Oct. 7, 1998.

(51) Int. Cl.⁷ ............................ H04J 11/00; H04B 7/216
(52) U.S. Cl. ...................... 370/208; 370/335; 370/342
(58) Field of Search ........................ 370/208, 209, 370/335, 342, 203, 204, 206; 375/130, 146; 708/532, 607

(56) References Cited

U.S. PATENT DOCUMENTS

| | | | | |
|---|---|---|---|---|
| 5,103,459 A | * | 4/1992 | Gilhousen et al. ......... 370/206 |
| 5,815,527 A | * | 9/1998 | Erving et al. ............... 375/140 |
| 5,995,497 A | * | 11/1999 | Gerakoulis ................. 370/320 |
| 6,041,034 A | * | 3/2000 | Fukumasa et al. ......... 370/203 |

* cited by examiner

*Primary Examiner*—Chau Nguyen
*Assistant Examiner*—Soon-Dong Hyun
(74) *Attorney, Agent, or Firm*—Henry T. Brendzel

(57) ABSTRACT

The invention provides an apparatus and method for generating overspread orthogonal codes. Overspread orthogonal codes are generated code-multiplying orthogonal codes generated by any method and the overspread orthogonal code length is the product of the code lengths of the orthogonal codes that were code-multiplied. In a telecommunication application, for example, a communication signal is first spread by a first orthogonal code and then overspread by a second orthogonal code. The output of the overspreading process may be further overspread by a third orthogonal code and so on until a desired code length is obtained. Thus, orthogonal code lengths unobtainable by any of the known orthogonal code generators may be generated by overspreading using codes generated by any orthogonal code generator(s) to obtain a desired code length.

20 Claims, 12 Drawing Sheets

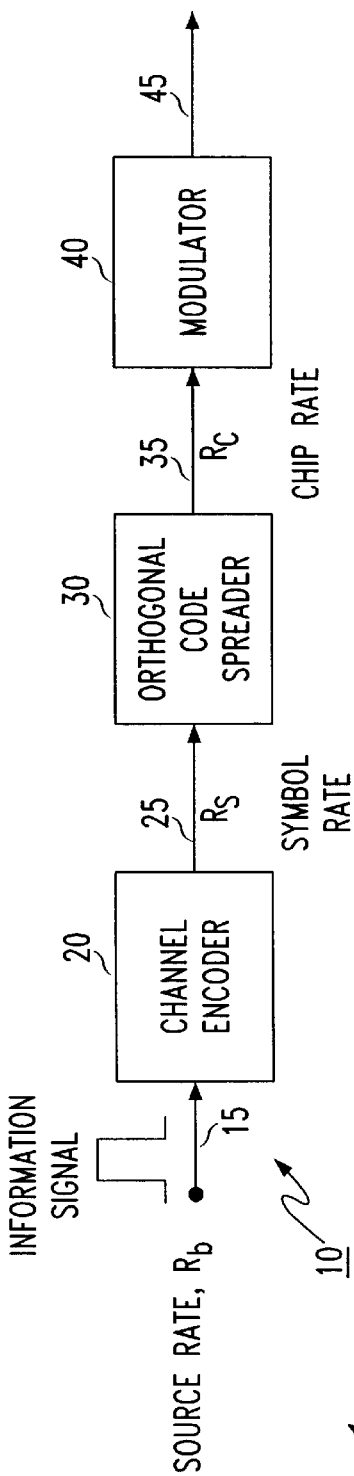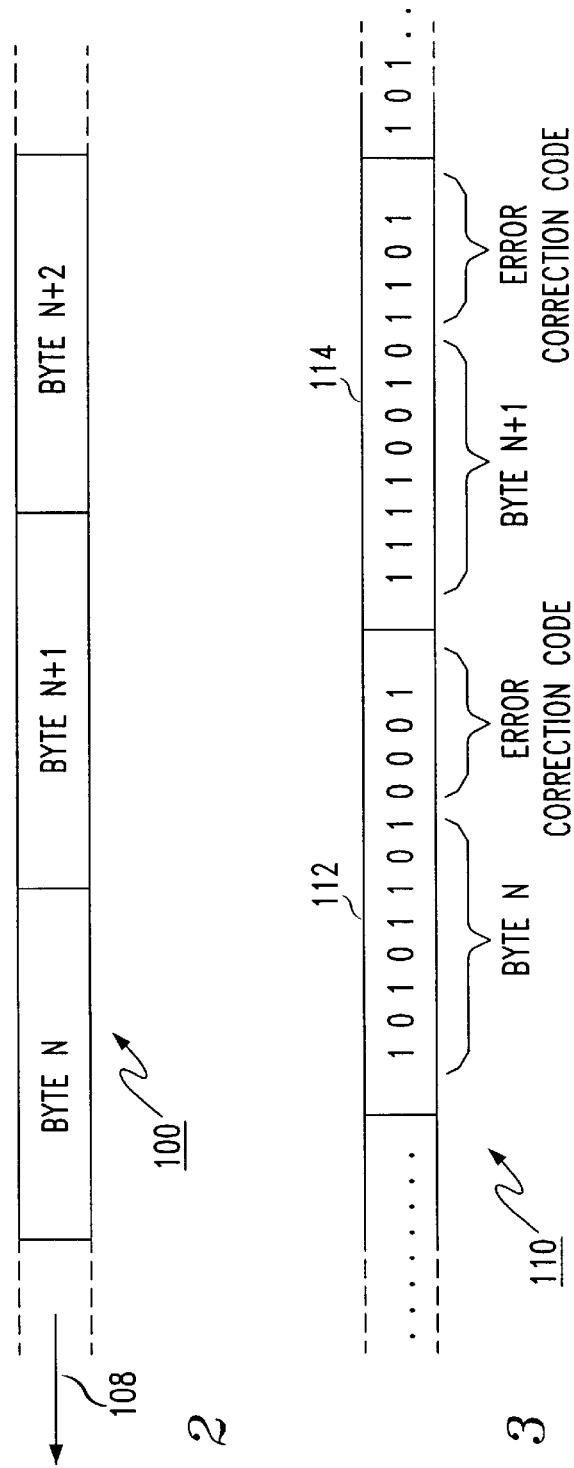
FIG. 1
FIG. 2
FIG. 3

$$C_8 = \begin{Bmatrix} 1 & 0 & 0 & 1 & 1 & 0 & 1 & 0 \\ 1 & 0 & 0 & 0 & 1 & 1 & 0 & 1 \\ 1 & 1 & 0 & 0 & 0 & 1 & 1 & 0 \\ 1 & 0 & 1 & 0 & 0 & 0 & 1 & 1 \\ 1 & 1 & 0 & 1 & 0 & 0 & 0 & 1 \\ 1 & 1 & 1 & 0 & 1 & 0 & 0 & 0 \\ 1 & 0 & 1 & 1 & 0 & 1 & 0 & 0 \\ 1 & 1 & 1 & 1 & 1 & 1 & 1 & 1 \end{Bmatrix} \begin{matrix} \}121 \\ \}123 \\ \}125 \\ \}127 \\ \}129 \\ \}131 \\ \}133 \\ \}135 \end{matrix}$$

*FIG. 5*

$$C_8 = \begin{Bmatrix} 1 & -1 & -1 & 1 & 1 & -1 & 1 & -1 \\ 1 & -1 & -1 & -1 & 1 & 1 & -1 & 1 \\ 1 & 1 & -1 & -1 & -1 & 1 & 1 & -1 \\ 1 & -1 & 1 & -1 & -1 & -1 & 1 & 1 \\ 1 & 1 & -1 & 1 & -1 & -1 & -1 & 1 \\ 1 & 1 & 1 & -1 & 1 & -1 & -1 & -1 \\ 1 & -1 & 1 & 1 & -1 & 1 & -1 & -1 \\ 1 & 1 & 1 & 1 & 1 & 1 & 1 & 1 \end{Bmatrix} \begin{matrix} \}120 \\ \}122 \\ \}124 \\ \}126 \\ \}128 \\ \}130 \\ \}132 \\ \}134 \end{matrix}$$

*FIG. 4*

| BYTE N | QR CODE 122 | SPREAD CHIP # |
|---|---|---|
| | | CHIPS 0-7 |
| | | CHIPS 8-15 |
| | | CHIPS 16-23 |
| | | CHIPS 24-31 |
| | | CHIPS 32-39 |
| | | CHIPS 40-47 |
| | | CHIPS 48-55 |
| | | CHIPS 56-63 |
| | | CHIPS 64-71 |
| | | CHIPS 72-79 |
| | | CHIPS 80-87 |
| | | CHIPS 88-95 |

*FIG. 6*

SYSTEM AND METHOD FOR GENERATING ORTHOGONAL CODES

This nonprovisional application claims the benefit of U.S. provisional application No. 60/111,261 entitled "System and Method For Coding information" filed on Oct. 7, 1998. The Applicants of the provisional application are Diakoumis P. Gerakoulis and Saeed S. Ghassemzadeh.

BACKGROUND OF THE INVENTION

1. Field of Invention

The invention relates to the field of generating orthogonal codes.

2. Description of Related Art

Orthogonal code generators for Quadratic Residue, Walsh-Hadamard, Twin Prime, etc. codes are well known in the art. However, each code generator has requirements that restrict the code length to specific values. For example, for the Walsh-Hadamard code, code lengths of $2^N$ for integer $N>0$ are defined. Code lengths of non-powers of 2 are undefined. Thus, there is a need for new technology to generate code lengths for orthogonal codes with greater flexibility.

SUMMARY OF THE INVENTION

The invention relates to a generalized apparatus and method for generating orthogonal codes to desired lengths by a new overspreading technique. Overspread orthogonal codes are generated by code-multiplying input orthogonal codes. The input orthogonal codes may be generated by any method and the overspread orthogonal code length is the product of the lengths of the input orthogonal codes. In telecommunication application, for example, a communication signal may be spread by a first orthogonal code and then overspread by a second orthogonal code. The output of the overspreading process may be further overspread by a third orthogonal code and so on until a desired code length is obtained. Thus, orthogonal code lengths unobtainable by any of the known orthogonal code generators may be generated using the overspreading technique with code-multiplication using codes generated by the same or different orthogonal code generators to obtain a desired code length. Additionally, different orthogonal codes of the same lengths may be generated using the overspreading technique.

BRIEF DESCRIPTION OF THE DRAWINGS

The invention is described with reference to the following drawings wherein like numerals reference like elements, and wherein:

FIG. 1 shows an exemplary process diagram for processing input signals;

FIG. 2 shows an example of an input signal stream;

FIG. 3 shows an example of a specific symbol pattern for the input signal stream;

FIG. 4 shows an example Quadratic Residue orthogonal codes used for spreading the input signal stream;

FIG. 5 shows the Quadratic Residue orthogonal codes of FIG. 4 expressed using 1s and 0s instead of 1s and −1s;

FIG. 6 shows spreading of a byte into spread chips 0–95;

DETAILED DESCRIPTION OF PREFERRED EMBODIMENTS

Figure 7:
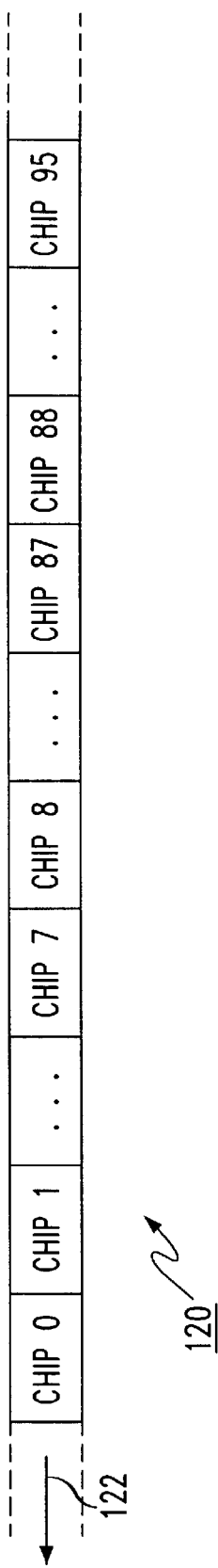
FIG. 7 shows a chip stream.

FIG. 1 shows a signal process 10 where orthogonal codes may be used. For example, the process 10 may be part of a telecommunication system such as a cellphone or a mobile base system. An input signal is received through a signal bus 15 into a channel encoder 20. The channel encoder 20 encodes the input signal and outputs the encoded signal via a signal bus 25 to an orthogonal code spreader 30. The orthogonal code spreader 30 spreads the encoded signal and outputs a spread signal to a modulator 40 via a signal bus 35. The modulator 40 modulates the spread signal onto a carrier signal, for example, and outputs the modulated signal via a signal bus 45.

Assuming that the input signal is a digital signal (analog signals may be correspondingly processed), then the input signal may be a stream of symbols having a symbol rate of $R_b$. If symbols are expressed in binary, then each symbol has a bit value of 1 or 0. However, for ease of discussion, symbol values of 1 and −1 are used unless otherwise indicated.

The channel encoder 20 may encode the input signal using an error correction code (ECC), for example, and append ECC symbols to each symbol byte or byte (8 symbols) of the input signal. Other channel encoder techniques may be used and the ECC symbols may have varying symbol lengths based on specific implementations. Thus, the symbol rate ($R_s$) output from the channel encoder 20 is greater than $R_b$ because a larger number of symbols are used to represent the input signal (i.e., the input signal symbols plus the ECC symbols).

The orthogonal code spreader 30 receives the encoded signals from the channel encoder 20 and spreads each symbol of the encoded signal according to an orthogonal code to generate the spread signal. The orthogonal code spreader 30 outputs the spread signal at a rate $R_c$ to the modulator 40 via the signal bus 35. $R_c$ is greater than $R_s$ because the orthogonal code spreader 30 spreads each of the symbols into a set of spread symbols as determined by an orthogonal code. The modulator 40 modulates the spread signal by applying techniques such as non-return-to-zero (NRZ) modulation and outputs the modulated signal via the signal bus 45.

FIG. 2 shows an example block diagram of the input signal. The input signal may be a symbol stream 100 flowing in a direction indicated by the arrow 108. The symbol stream 100 is grouped into 8 symbol units or bytes such as byte N, N+1 and N+2. The channel encoder 20 receives byte N before byte N+1, and receives byte N+1 before byte N+2, for example. The channel encoder 20 may process each byte of the input signal independently and generate an error correction code corresponding to each byte.

For example, FIG. 3 shows an example of an output symbol stream 110 of the channel encoder 20 which is the encoded signal. The channel encoder 20 may append four error correction code symbols to each byte of the input signal. As shown in FIG. 3, four ECC symbols are appended to the 8 symbols of byte N to form an encoder output 112 corresponding to byte N. The channel encoder 20 performs a similar function with byte N+1 and generates an encoder output 114 corresponding to byte N+1 and so on with all the bytes received via the input bus 15. Thus, if the input signal rate $R_b$ is 64 symbols per second, then the rate $R_s$ at the output of the channel encoder 20 would be 96 symbols per second. Thus, $R_s$ is 1.5 times $R_b$.

FIG. 4 shows an orthogonal code matrix C8 generated using Quadratic Residue code of length 8. Each row of the matrix $C_8$ is a Quadratic Residue (QR) code. For example, row 1 is QR code 120, row 2 is QR code 122 and so on. Thus, rows 1–8 are QR codes 120–134. Each of the QR codes 120–134 are orthogonal to each other. Thus, the correlation of each QR code 120–134 with any of the other QR codes 120–134 is 0 and the auto correlation of a QR code 120–134 with itself is 1. If the orthogonal code matrix $C_8$ is unipolar (e.g., all positive), 1's and −1's may be replaced by 1's and 0's, respectively. As shown in FIG. 5, QR codes 121–135 correspond to QR codes 120–134. For the following discussion +1 and −1 are used.

The QR codes 120–134 may be used to spread multiple cellphone signals, for example. Each of the QR codes 120–134 may be selected for performing the spreading process for a different cellphone. For example, if multiple cellphones are used within a single mobile base station cell, the $C_8$ matrix may support 8 such cellphones for simultaneous communication without the cellphones interfering with each other. The mobile base station receives the signals from all the cellphones and correlates (or decodes) the signals received with each of the respective QR codes 120–134. Assuming that all received coded input signals are synchronized, only the input signal that was spread by a selected QR code 120–134 is decoded by that QR code 120–134 because input signals spread by other QR codes 120–134 are eliminated by the correlation process. The above-described coding and decoding scheme is known as Code Division Multiple Access system (CDMA).

Following the CDMA scheme, the symbol stream 110 shown in FIG. 3 may be spread using the QR code 122, for example, to generate the output coding sequence shown in FIG. 6. For this example, the first symbol of byte N is a 1 and the orthogonal code spreader 30 outputs spread chips 0–7 using the QR code 122. A chip is defined as an output of the orthogonal code spreader 30 for one eighth of an input symbol (i.e., each symbol is expanded into eight chips). Correspondingly, the second symbol of byte N is a −1 and the orthogonal code spreader 30 spreads the −1 into output spread chips 8–15. Spread chips 8–15 are symbols of an inverted QR code 122 (i.e., QR code 122 with a 1 changed to a −1 and a −1 to a 1). The third symbol of byte N 102 is a 1 and spread chips 16—23 (QR code 122) are output by the orthogonal code spreader 30 and so on for all of the symbols of byte N resulting in spread chips 0–95. In this way, the encoded signal is spread by the QR code 122. The output symbol rate Rc of the orthogonal code spreader 30 for $C_8$ is 8 times the output symbol rate $R_s$ of the channel encoder 20. Thus, $R_c$ is equal to 8 times $R_s$, and $R_s$ is 1.5 times $R_b$.

Figure 8:
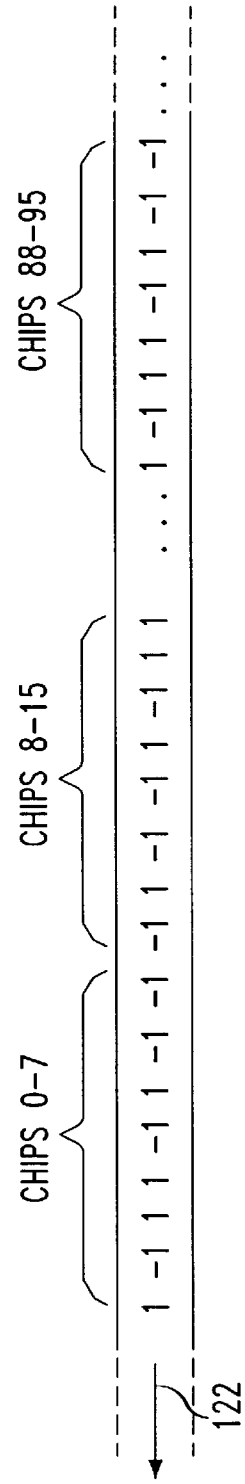
FIG. 8 shows a symbol stream corresponding to the chip stream of FIG. 7.

While FIG. 6 shows the chips 0–95 in a matrix format, the chips 0–95 are output by the orthogonal code spreader 30 in a chip stream. For example, FIG. 7 shows a diagram of a chip stream 120 output by the orthogonal code spreader 30. The chips 0–95 are output in a direction 122 onto the bus 35. FIG. 8 shows the actual symbol stream 124 corresponding to the chip stream 120 for the above-described example.

Figure 9:
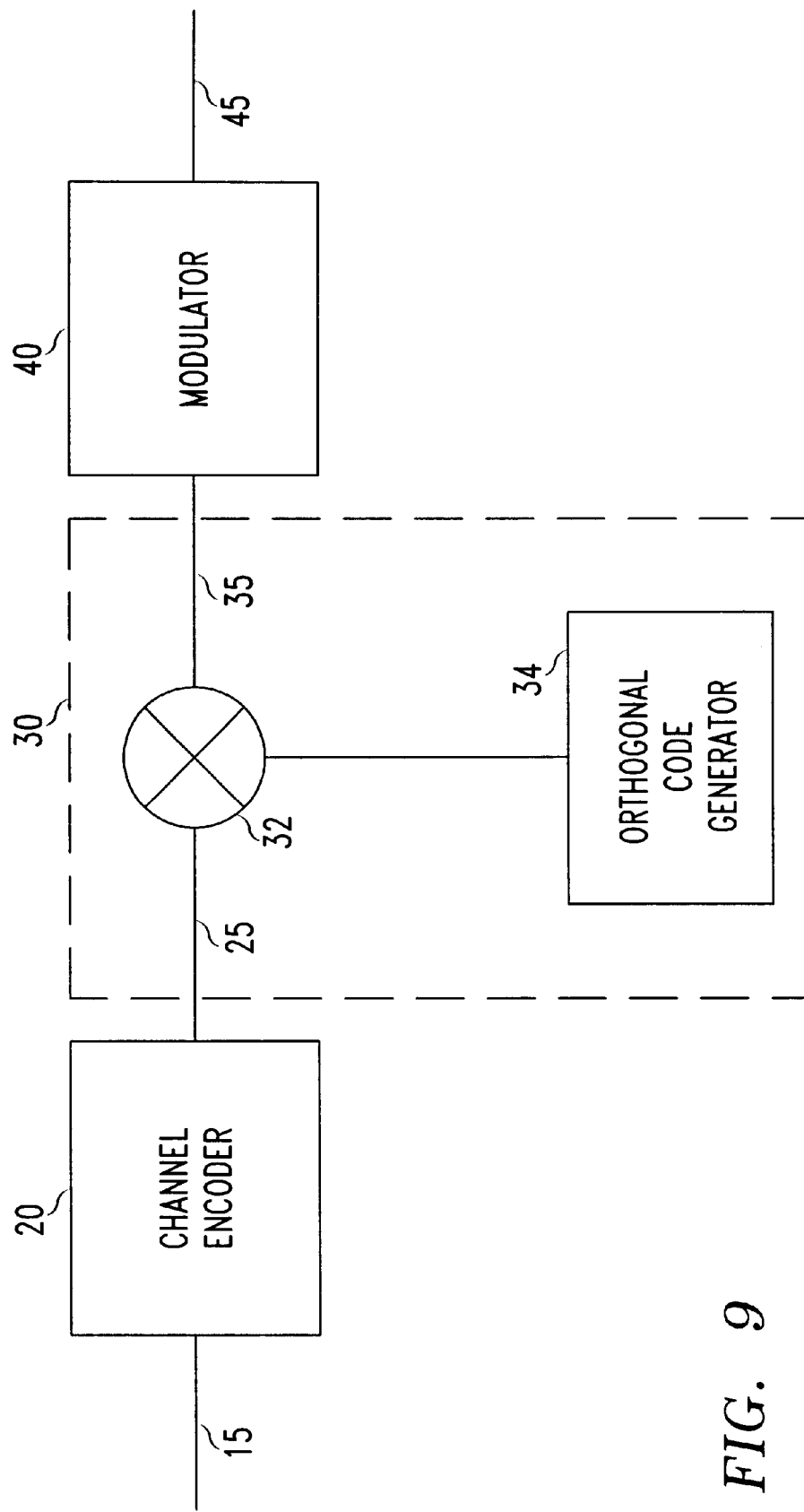
FIG. 9 shows a structure for an orthogonal code generator incorporated into the process shown in FIG. 1.

FIG. 9 shows the orthogonal code spreader 30 expanded in greater detail. Based on the example discussed above, the spreader 32 spreads the encoded signal received from the bus 25 based on a selected orthogonal code generated by the orthogonal code generator 34. Thus, for the example above, the spreader 32 receives the QR code 122 from the orthogonal code generator 34 and spreads the encoded signal received via the bus 25 by outputting the QR code 122 or the inverted QR code 122 based on whether the symbol of the encoded signal is a 1 or a −1, respectively. The spreader 32 outputs the spread signal via the bus 35 to the modulator 40.

The orthogonal code generator 34 shown in FIG. 9 generates orthogonal codes based on a single orthogonal code generation technique such as Quadratic Residue, Walsh-Hadamard or Twin Prime, for example. As discussed above, each of these orthogonal code generation techniques have limitations due to the fundamental assumptions related to the algorithms relied upon to generate the orthogonal code. For example, a Quadratic Residue orthogonal code of a length L only exists for L=4t where 4t−1 is a prime number and t is a positive integer. Thus, Quadratic Residue orthogonal codes may have lengths of 4, 8, 20, 24, 32, etc. A special case of the Quadratic Residue code having a length of 2 may also be constructed.

Walsh-Hadamard codes are defined for lengths of $2^N$ for integer N>0. Thus, Walsh-Hadamard codes (or Walsh codes) are defined for lengths of 2, 4, 8, 16, etc.

Figure 10:
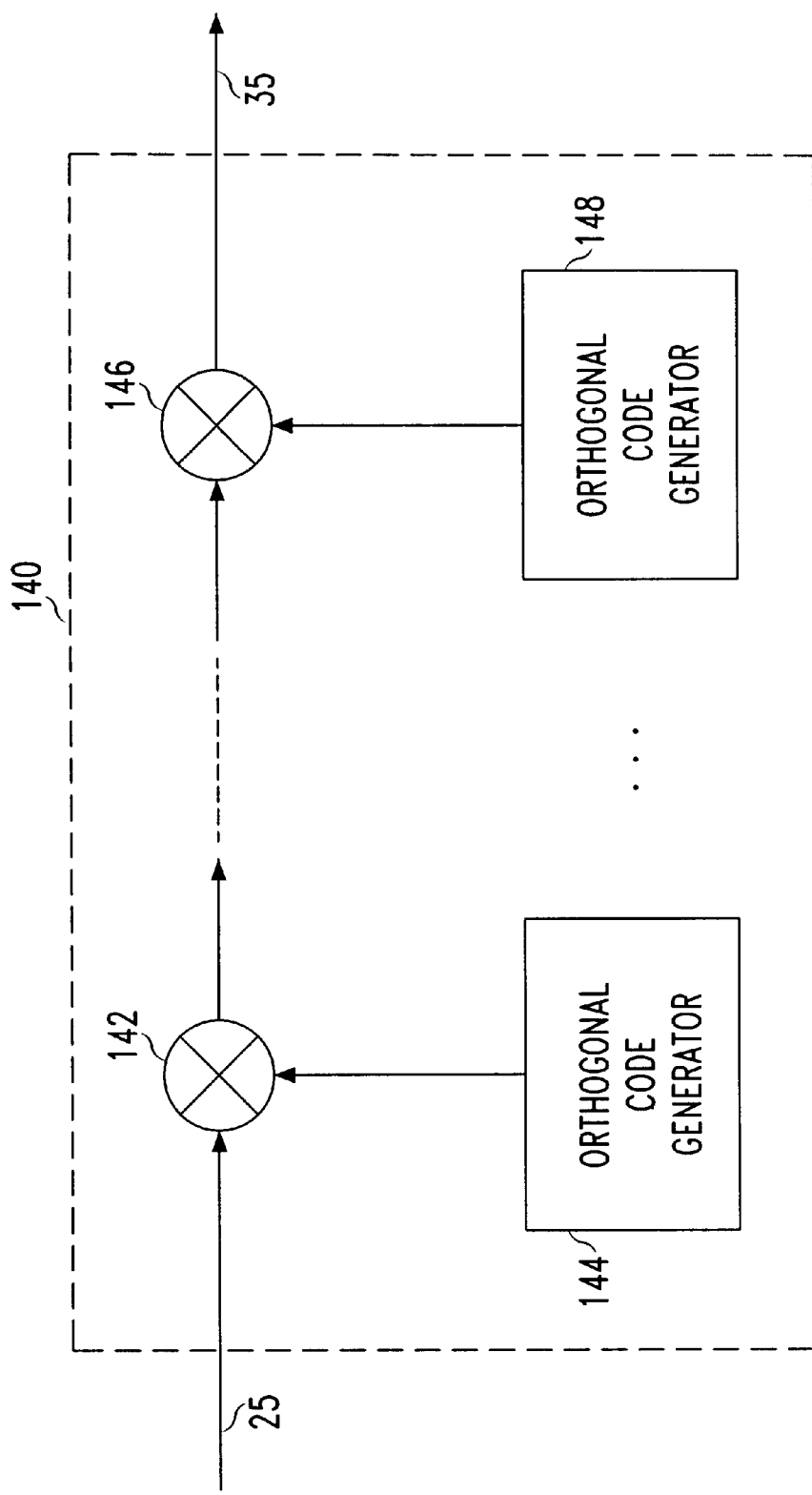
FIG. 10 shows an overspreading orthogonal code generator.

As indicated above, each specific orthogonal code generation technique restricts the code length to specific values, thus restricting the flexibility of possible code lengths. The invention expands the flexibility of obtainable code lengths by providing an overspreading technique to generate new orthogonal codes. As shown in FIG. 10, the orthogonal code spreader 30 may be replaced by a new orthogonal code spreader 140 where a plurality of orthogonal code spreaders 142–146 are used to spread and overspread the input signal using orthogonal code generators 144–148. As indicated in FIG. 10, more than two orthogonal code spreaders 144–146 and orthogonal code generators 144–148 may be used. Fewer orthogonal code generators 144–148 than orthogonal code spreaders 142–146 may be used where a particular orthogonal code generator 144–148 may provide orthogonal codes to more than one code spreader 142–146. In the following discussion, two spreaders associated with two corresponding orthogonal code generators are assumed for simplicity of discussion. Also, the orthogonal code generators 144–148 may be implemented by simple storage elements that store one or more selected codes. More complex processors could also be used to generate the orthogonal codes.

The orthogonal code generators 144 and 148 may use any orthogonal code generation techniques without restriction. For example, the orthogonal code generator 144 and the orthogonal code generator 148 may provide codes based on identical code generation techniques such as Quadratic Residue technique or the orthogonal code generator 144 may use Quadratic Residue technique while the orthogonal code generator 148 may use a Walsh-Hadamard technique.

Figures 11, 12:
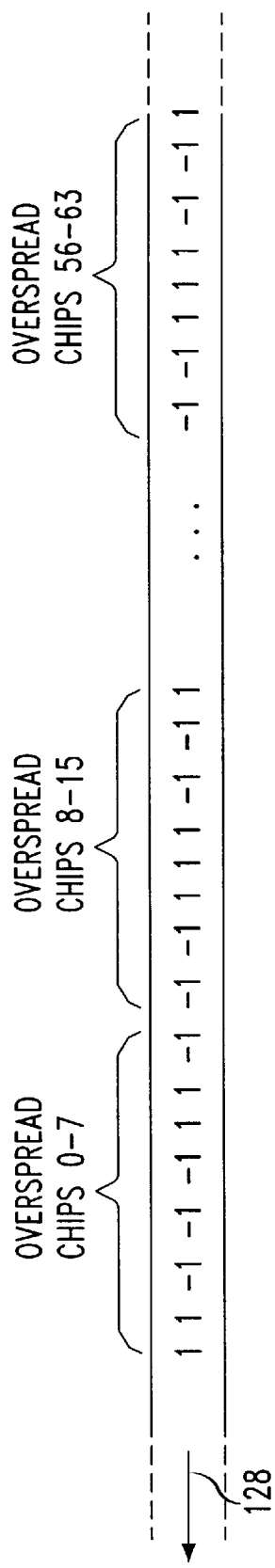
FIG. 11 shows overspread chips generated by overspreading chips 0–7 of FIG. 6.
FIG. 12 shows a symbol stream corresponding to the overspread chips of FIG. 11.

Assuming that both the orthogonal code generators 144 and 148 are Quadratic Residue code generators using the code matrix $C_8$ as shown in FIG. 4, then the output of the orthogonal code spreader 142 are the spread chips 0–11 shown in FIG. 6. The orthogonal code spreader 146 receives the spread chips 0–11 and overspreads the spread chips 0–11 using one of the QR codes 120–134. Assuming that QR code 130 is selected, then FIG. 11 shows overspread chips 0–63 generated and output by the spreader 146 based on the spread chips 0–7. FIG. 12 shows the symbol stream 126 flowing in a direction 128. The symbol stream 126 is an output of the orthogonal code spreader 146 corresponding to the chips 0–63.

For the above example where two Quadratic Residue orthogonal codes from the code matrix $C_8$ are used, the resulting overspread orthogonal code is one of the codes of a code matrix $C_{64}$. $C_{64}$ is obtained by code-multiplying $C_8$ times $C_8$. A code-multiply of a fist code matrix and a second code matrix is performed by replacing values of the first code matrix with the second code matrix. For matrix values expressed by n and –n where n is a positive integer (e.g., 1), the value n of the second code matrix is replaced by n times the first code matrix and the value –n of the second code matrix is replaced by –n times the first code matrix.

Figure 13:
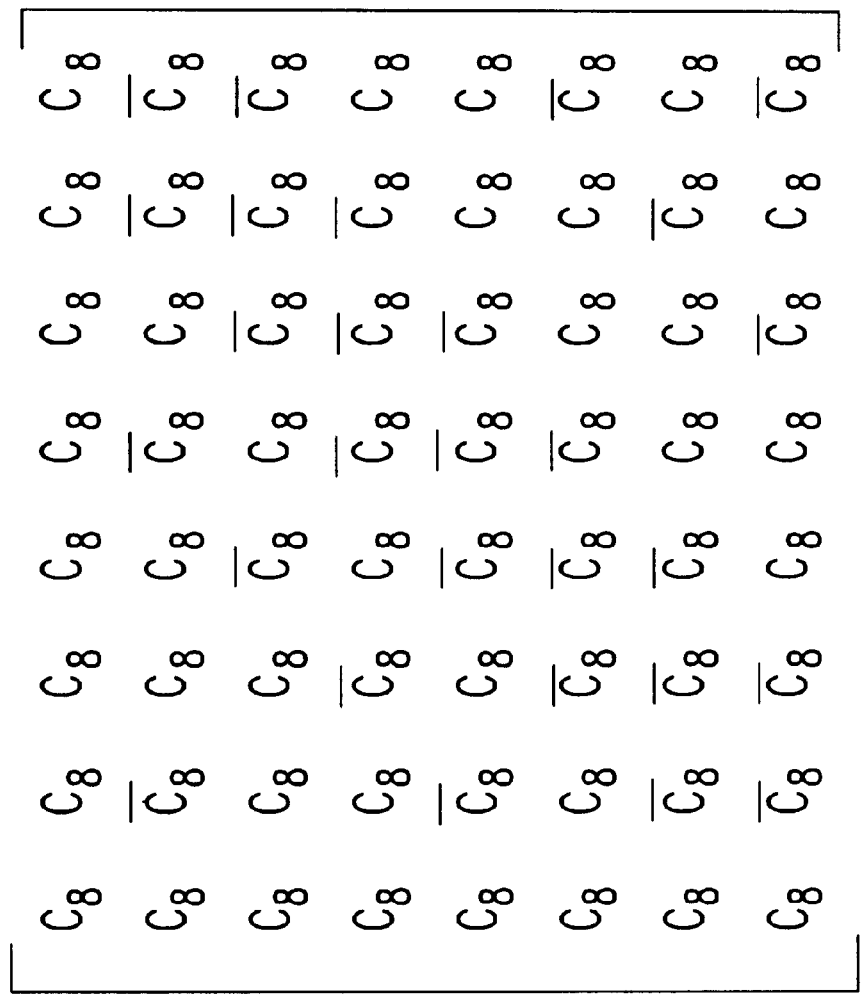
FIG. 13 shows the orthogonal code matrix corresponding to overspreading by code-multiplying two orthogonal matrices of length 8 for an overspreading code length of 64.

Thus, the $C_{64}$ matrix is generated by multiplying the first $C_8$ matrix with each of the values of the second $C_8$ matrix. Equivalently, as shown in FIG. 13, $C_{64}$ may be represented as a matrix of the first $C_8$ matrices where each position of the second $C_8$ matrix is either the $C_8$ matrix or an inverted $C_8$ ($-C_8$) matrix depending on whether the value of the second $C_8$ matrix at that position is a 1 or a –1. This code-multiplication operation may be performed for any number of orthogonal codes to generate new orthogonal codes. The length of an overspread orthogonal code is the product of the lengths of the orthogonal codes that are code-multiplied. Thus, an overspread orthogonal code length may be obtained as long as the length may be factored into products of lengths of orthogonal codes generated by any orthogonal code generation technique.

The Table below shows a non-exhaustive list of code lengths obtainable by using Quadratic Residue, Walsh or Twin Prime orthogonal code generation techniques. Overspreading may be used to obtain orthogonal code lengths which are products of the lengths are shown in the Table. For example, a code length of 96 cannot be obtained by any of the above three orthogonal code generation techniques. However, by overspreading, either a Quadratic Residue code or a Walsh code of length 8 may be used in conjunction with the Quadratic Residue code of length 12 to obtain an overspread orthogonal code length 96 because 8 times 12 is 96.

In addition, while only the Walsh code is shown to be capable of generating a code length of 64, the same length may be obtained using two Quadratic Residue codes of length 8. Thus, overspreading not only provides code lengths that are not otherwise obtainable, new orthogonal code sequences may be obtained via overspreading which are different from codes obtained using only a single orthogonal code generation technique.

Figure 14:
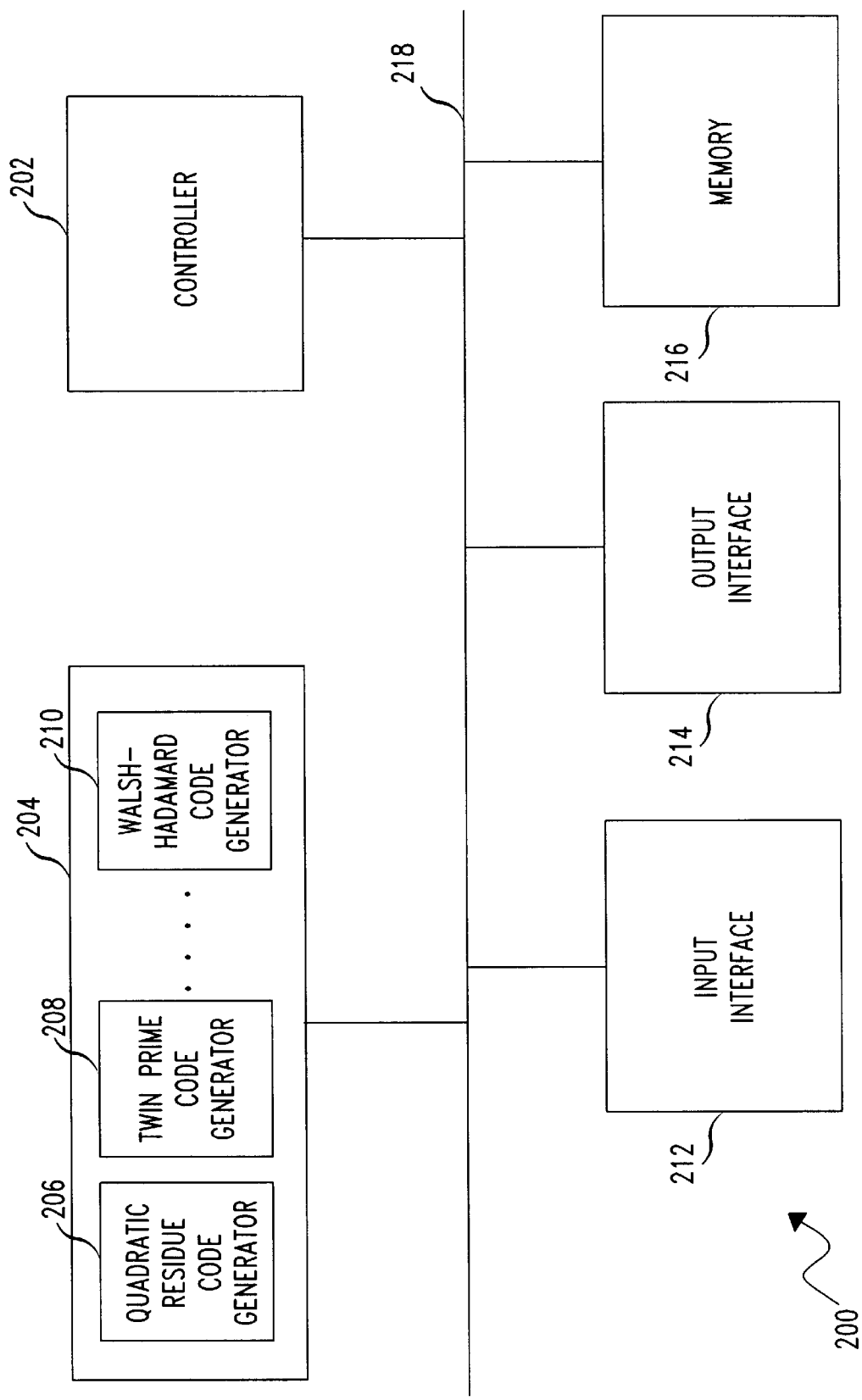
FIG. 14 shows an exemplary block diagram of an overspreading code generator.

FIG. 14 shows an exemplary block diagram of an overspreading orthogonal code generator 200. The overspreading orthogonal code generator 200 includes a controller 202, an orthogonal code generator 204 that includes code generators for various code generating techniques such as a Quadratic Residue code generator 206, a Twin Prime code generator 208 and a Walsh-Hadamard code generator code 210. The overspreading orthogonal code generator 200 may also include an input interface 212, an output interface 214 and a memory 216. The above components may be coupled together via a signal bus 218.

The overspreading orthogonal code generator 200 may be implemented using any available technologies such as digital signal processors (DSP), application specific integrated circuits (ASIC), PLAs, PLDs or general purpose processors as is well known in the art. In addition, while FIG. 14 shows a specific bus architecture, many other types of architectures may also be used as dictated by various implementation details.

The overspreading orthogonal code generator 200 may receive a request via the input interface 212 to generate a specific overspreading orthogonal code that specifies the lengths of orthogonal codes generated by specified coding techniques. After receiving the request, the controller 202 verifies whether the requested code length and the specified code generation techniques are valid. If valid, the controller 202 proceeds to command the orthogonal code generator 204 to generate code matrices of the selected orthogonal codes. The orthogonal code matrices may be placed into the memory 216 as each of the matrices are generated. After all the selected orthogonal code matrices are generated, the controller 202 determines whether the request requires any of the matrices to be combined into a combination matrix by code-multiplying multiple matrices together by the code multiplication process discussed above. After the code-multiplication process is completed, the orthogonal code matrices may be output via the output interface 214.

Figure 15:
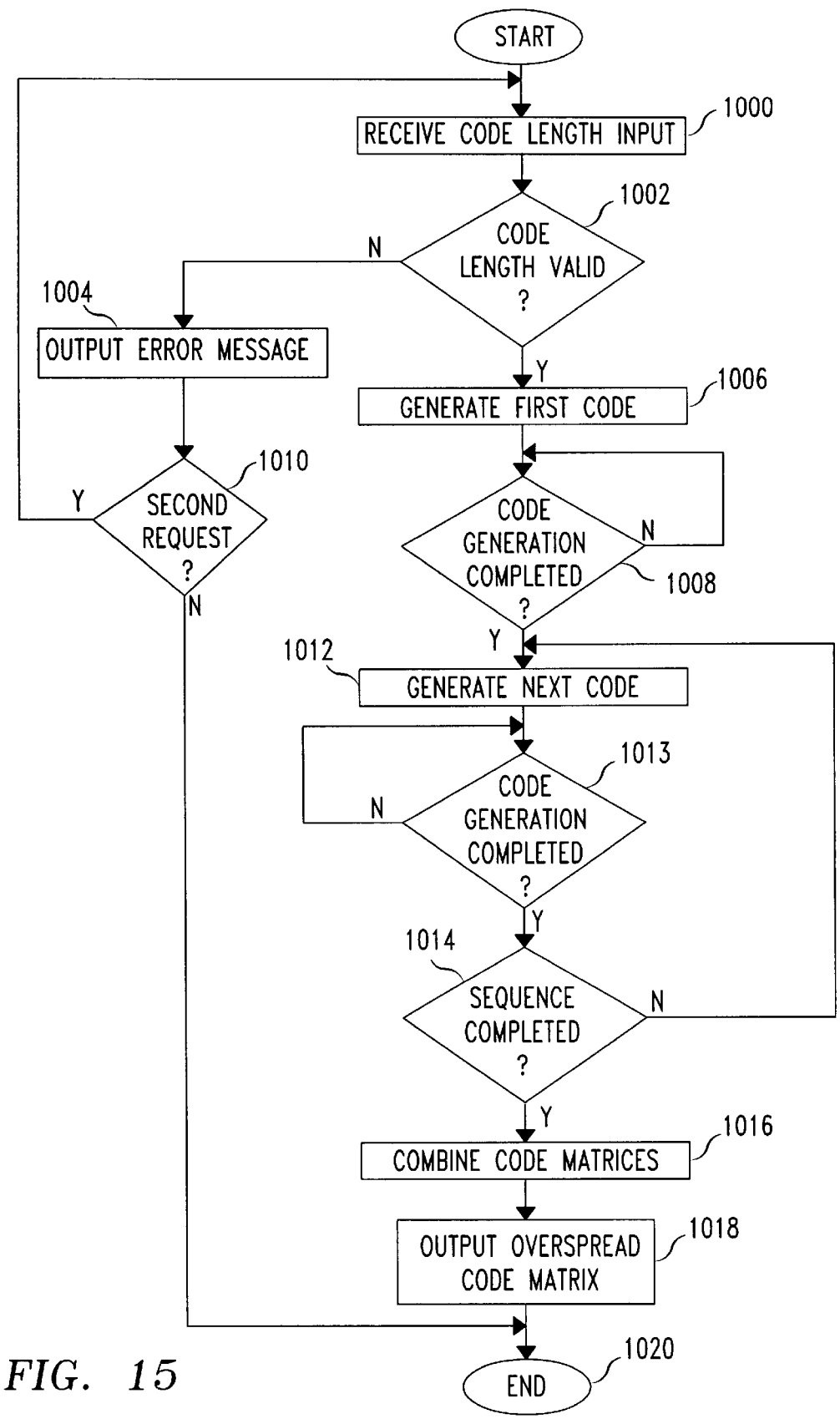
FIG. 15 shows an exemplary flowchart of an overspreading code generator process.

FIG. 15 shows a flowchart of an exemplary process for generating overspread orthogonal codes. In step 1000, the controller 202 receives a request for generating an overspread orthogonal code and goes to step 1002. In step 1002, the controller 202 verifies that the code length required by the request is valid for the selected orthogonal code generation techniques. If valid, the controller 202 goes to step 1006; otherwise, the controller 202 goes to step 1004. In step 1004, the controller 202 outputs an error message and goes to step 1010. In step 1010, the controller 202 determines whether a second request is received. If a second request is received, the controller 202 returns to step 1000; otherwise, the controller 202 goes to step 1020 and ends the process.

In step 1006, the controller 202 issues a command to the orthogonal code generator 204 to generate a first code and goes to step 1008. In step 1008, the controller 202 determines whether the code generation process has completed. If completed, the controller 202 goes to step 1012; otherwise, the controller 202 returns to step 1008. In step 1012, the controller 202 issues a command for the orthogonal code generator to generate a next code based on the request and goes to step 1013. In step 1013, the controller 202 determines whether the code generation process has completed. If completed, the controller 202 goes to step 1014; otherwise, the controller 202 returns to step 1013.

In step 1014, the controller 202 determines whether the complete sequence of orthogonal codes has been generated. If the complete sequence has been generated, the controller 202 goes to step 1016; otherwise, the controller 202 returns to step 1012 and proceeds to issue a command to generate the next code. In step 1016, the controller 202 determines from the request whether any of the generated orthogonal code matrices should be combined. If a combination is required, the controller 202 proceeds to generate combined matrices by performing code-multiplication among the generated orthogonal code matrices and goes to step 1018. In step 1018, the controller 202 outputs the overspread orthogonal code matrices or a single overspread orthogonal code matrix if one combined matrix is requested and goes to step 1020 to end the process.

Figure 16:
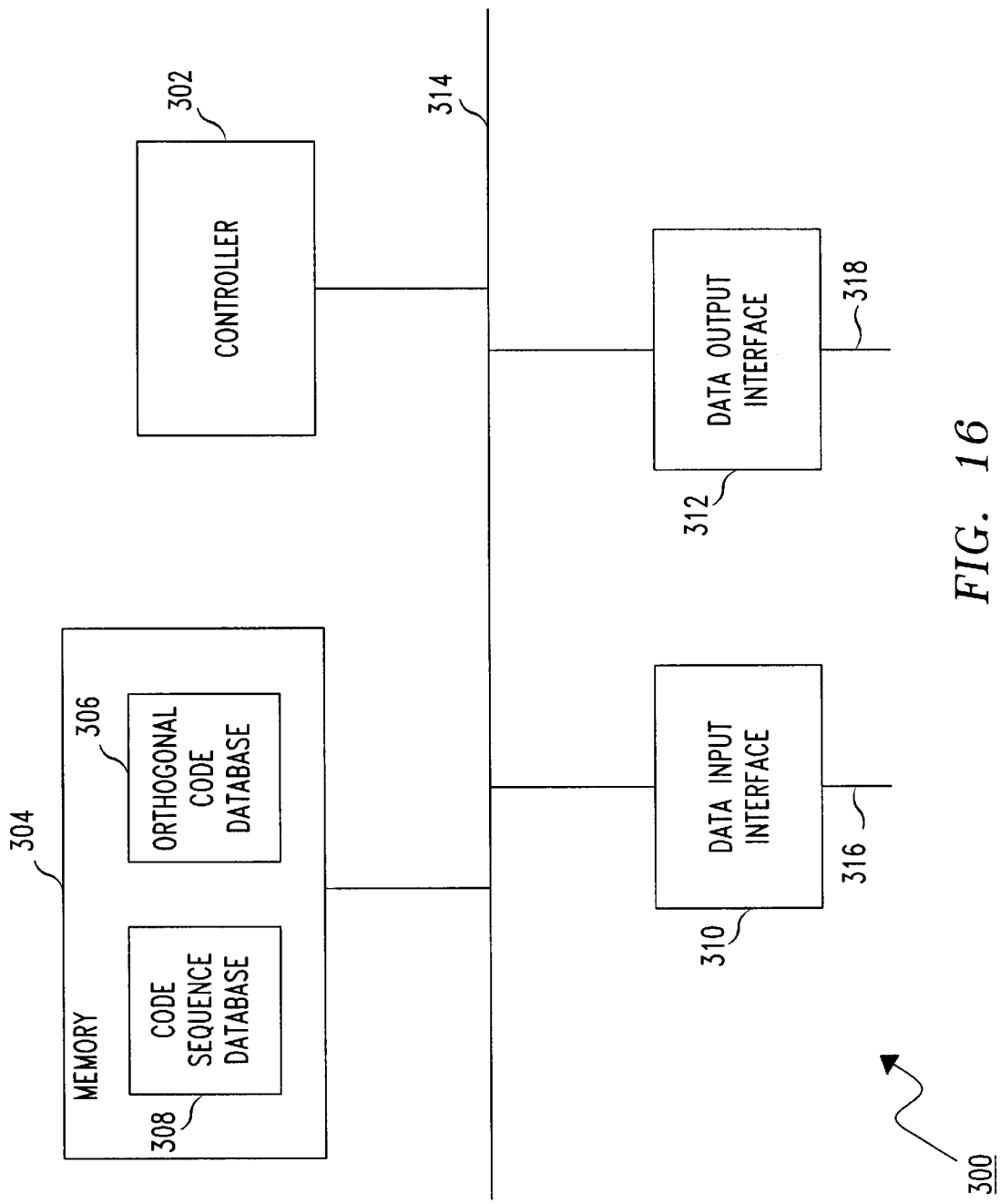
FIG. 16 shows an exemplary block diagram of a signal coder using overspreading codes.

FIG. 16 shows an overspread orthogonal code spreader 300 that corresponds to the overspread orthogonal code spreader 140 discussed above. The overspread orthogonal code spreader 300 includes a controller 302, a memory 304, a data input interface 310 and a data output interface 312. The above components are coupled together via a signal bus 314.

The memory 304 includes databases such as a code sequence database 308 and an orthogonal code database 306. The orthogonal code database 306 is initialized with orthogonal code matrices that are generated by the overspreading orthogonal code generator 200, for example. Each of the orthogonal codes are individually identified by an identifier and the code sequence database 308 includes lists of such identifiers so that input signals may be spread and overspread according to a selected code sequence.

The data input interface 310 receives the input signal to be overspread via the signal bus 316 and the data output interface 312 outputs the overspread signal via a signal bus 318. If the overspread orthogonal code spreader 300 replaces for the orthogonal code spreader 30, then the signal bus 316 would be connected to signal bus 25 and the signal bus 318 would be connected to signal bus 35.

The overspreading orthogonal code spreader 300 may be implemented using a variety of technologies such as DSPs, ASICs, PLAs, PLDs, etc. as is well known in the art. The bus architecture example is shown for ease of illustration. Other architectures may be implemented as is well known in the art.

The overspreading orthogonal code spreader 300 is first initialized with the appropriate orthogonal code database 306 and the appropriate code sequence database 308. When an input signal is input via the data input interface 310 as a symbol stream, the controller 302 overspreads each symbol based on the code sequence of selected orthogonal codes that are initialized in the memory 304 and outputs the overspread signal via the data output interface 312 to a following process such as a modulator, for example. This process continues until either the overspread orthogonal code spreader 300 is reinitialized or the input symbol stream is exhausted.

Figure 17:
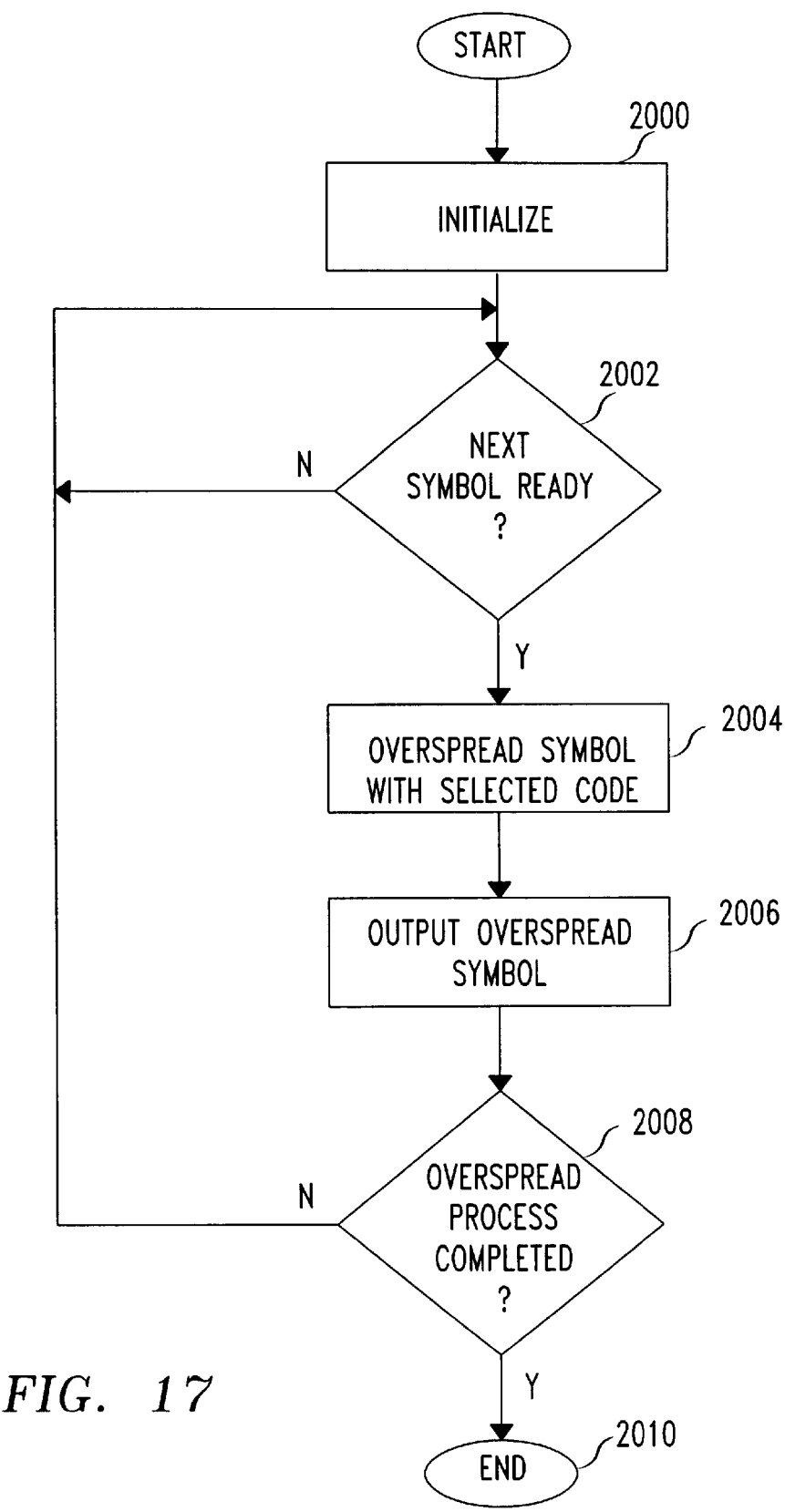
FIG. 17 shows an exemplary flowchart of overspreading using overspreading codes.

FIG. 17 shows a flowchart of the overspread orthogonal code spreader 300. In step 2000, the overspread orthogonal code spreader 300 is initialized and the process goes to step 2002. In step 2002, the controller 302 determines whether a next symbol is ready to be overspread. If ready, the controller 302 goes to step 2004; otherwise, the controller 302 returns to step 2002. In step 2004, the controller 302 spreads the symbol using an orthogonal code retrieved from the orthogonal code database 306 based on a code sequence retrieved from the code sequence database 308 and goes to step 2006. In step 2006, the controller 302 outputs the overspread symbol through the data output interface 312 and goes to step 2008. In step 2008, the controller 302 determines whether the overspread process is completed. If completed, the controller 302 goes to step 2010 to end the process; otherwise, the controller 302 returns to step 2002.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the scope of the invention.

What is claimed is:

1. A method for generating overspread orthogonal codes, comprising:

selecting an orthogonal code from each of two orthogonal matrices, where at least one of which has a length other than a power of 2; and code-multiplying the at least two orthogonal codes to generate an overspread orthogonal code.

2. A method for generating overspread orthogonal codes comprising:

selecting at least two orthogonal codes from two orthogonal matrices, respectively; and code-multiplying the at least two orthogonal codes to generate an overspread orthogonal code by replicating a first code of the two orthogonal codes based on values of a second code of the two orthogonal codes.

3. The method of claim 2, the replicating comprising:

replacing a code value of n of the second code with n times the first code and replacing a code value of −n of the second code with −n times the first code if the second code has values of n and −n, where n is a positive integer; and replacing the code value of 1 of the second code with the first code and replacing a 0 of the second code with a one's complement of the first code if the second code has values of n and 0, where the first and the second codes are expressed with binary values of 1s and/or 0s.

4. The method of claim 1, the code-multiplying comprising:

replicating a first matrix of the two orthogonal matrices based on a second matrix of the two orthogonal matrices to generate an overspread matrix; and selecting a row of the overspread matrix as the overspread orthogonal code.

5. The method of claim 4, the replicating comprising:

replacing a code value of n of the second matrix with n times the first matrix and replacing a code value of −n of the second matrix with −n times the first matrix if the first and the second matrices are expressed with non-zero integer values of n and −n; and replacing the code value of 1 of the second matrix with the first matrix and replacing a 0 of the second matrix with a one's complement of values of the first matrix if the first and the second matrices are expressed with binary values of 1s and/or 0s.

6. The method of claim 1, wherein each of the two orthogonal matrices is generated based on one of a Quadratic Residue code, Walsh-Hadamard code, Twin-Prime code, or an overspread code.

7. The method of claim 6, wherein the overspread code is generated by code-multiplying two or more orthogonal codes.

8. The method of claim 1, wherein a length of the overspread code is a product of lengths of the at least two orthogonal codes.

9. A method for overspreading an input signal using the overspread orthogonal code of claim 2, comprising:

receiving a symbol from an input source;

generating a modified overspread orthogonal code based on the symbol and the overspread orthogonal code; and outputting the modified overspread orthogonal code as an overspread input signal.

10. The method of claim 9, the generating a modified overspread orthogonal code comprising:

multiplying the overspread orthogonal code and a value of the symbol if the overspread orthogonal code is expressed with non-zero integer values of n and −n and the symbol is expressed with non-zero integer values of m or −m; or replacing the symbol with the overspread orthogonal code if the value of the symbol is a 1 and replacing the symbol with a one's complement of values of the overspread orthogonal code if the value of the symbol is a 0, where the symbol and the overspread orthogonal code are expressed with binary values of 1s and/or 0s.

11. An apparatus for generating overspread orthogonal codes, comprising:

a memory, the memory storing at least two orthogonal codes selected from two orthogonal matrices, respectively, at least one of said two orthogonal codes is a code with a length other than a power of 2; and a controller coupled to the memory, the controller code-multiplying the at least two orthogonal codes to generate an overspread orthogonal code.

12. An apparatus for generating overspread orthogonal codes comprising:

a memory storing at least two orthogonal codes selected from two orthogonal matrices, respectively; and a controller coupled to the memory, the controller code-multiplying the at least two orthogonal codes to generate an overspread orthogonal code by replicating a first code of the two orthogonal codes based on values of a second code of the two orthogonal codes.

13. The apparatus of claim 12, wherein the controller replicates the first code of the two orthogonal codes based on values of a second code of the two orthogonal codes by:

replacing a code value of n of the second code with n times the first code and replacing a code value of −n of the second code with −n times the first code if the second code has values of n and −n, where n is a positive integer; and replacing the code value of 1 of the second code with the first code and replacing a 0 of the second code with a one's complement of the first code if the second code has values of n and 0, where the first and the second codes are expressed with binary values of 1s and/or 0s.

14. The apparatus of claim 11, wherein the controller performs the code-multiplication by:

replicating a first matrix of the two orthogonal matrices based on a second matrix of the two orthogonal matrices to generate an overspread matrix; and selecting a row of the overspread matrix as the overspread orthogonal code.

15. The apparatus of claim 14, wherein the controller generates the overspread matrix by:

replacing a code value of n of the second matrix with n times the first matrix and replacing a code value of −n of the second matrix with −n times the first matrix if the first and the second matrices are expressed with non-zero integer values of n and −n; and replacing the code value of 1 of the second matrix with the first matrix and replacing a 0 of the second matrix with a one's complement of values of the first matrix if the first and the second matrices are expressed with binary values of 1s and/or 0s.

16. The apparatus of claim 11, wherein each of the two orthogonal matrices is generated based on one of a Quadratic Residue code, Walsh-Hadamard code, Twin-Prime code, or an overspread code.

17. The apparatus of claim 16, wherein the overspread code is generated by code-multiplying two or more orthogonal codes.

18. The apparatus of claim 11, wherein a length of the overspread code is a product of lengths of the at least two orthogonal codes.

19. An apparatus for overspreading an input signal comprising:

a serial connection of at least two modulating elements, each having an input port, an output port, and an orthogonal code port, where a first element of said serial connection is responsive to said input signal, an $n^{th}$ element of said serial connection having its input port connected to output port of $(n-1)^{th}$ element of said serial connection, where n>1, and a last element in said serial connection developing a signal that corresponds to said overspreading of said input signal;

a controller that applies a code $C_i^j$ from a set j of orthogonal codes to a modulating element i, wherein at least one of the codes has a length other than a power of 2.

20. The apparatus of claim 19, where said sets of orthogonal codes are distinct.

* * * * *